(12) United States Patent
Folkers et al.

(10) Patent No.: US 11,156,112 B2
(45) Date of Patent: Oct. 26, 2021

(54) METHOD AND APPARATUS FOR MOUNTING A TRANSITION DUCT IN A GAS TURBINE ENGINE

(71) Applicant: Chromalloy Gas Turbine LLC, Palm Beach Gardens, FL (US)

(72) Inventors: Daniel L. Folkers, Stuart, FL (US); Charles A. Ellis, Stuart, FL (US); Pedro E. Rivero, Palm Beach Gardens, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 292 days.

(21) Appl. No.: 16/178,677

(22) Filed: Nov. 2, 2018

(65) Prior Publication Data
US 2020/0141251 A1 May 7, 2020

(51) Int. Cl.
*F23R 3/60* (2006.01)
*F01D 9/02* (2006.01)

(52) U.S. Cl.
CPC .............. *F01D 9/023* (2013.01); *F23R 3/60* (2013.01); *F23R 2900/00014* (2013.01)

(58) Field of Classification Search
CPC .. F01D 9/023; F23R 3/60; F16L 27/08; F16L 27/12; F16L 27/125; F16L 27/127; F16L 27/1275; F16L 27/12751; F16L 25/00; F16L 31/00; F16L 33/00; F16L 35/00; F16L 49/00
See application file for complete search history.

(56) References Cited

U.S. PATENT DOCUMENTS

| | | | | |
|---|---|---|---|---|
| 6,619,915 | B1* | 9/2003 | Jorgensen | F01D 9/023 138/109 |
| 6,662,567 | B1* | 12/2003 | Jorgensen | F01D 9/023 60/796 |
| 6,675,584 | B1* | 1/2004 | Hollis | F01D 9/023 60/796 |
| 2004/0031270 | A1* | 2/2004 | Sileo | F01D 9/023 60/796 |
| 2004/0031271 | A1* | 2/2004 | Jorgensen | F02C 7/20 60/796 |
| 2005/0047907 | A1* | 3/2005 | Nordlund | F01D 25/12 415/116 |
| 2005/0279099 | A1* | 12/2005 | Zborovsky | F01D 9/023 60/752 |

(Continued)

OTHER PUBLICATIONS

International search Report and Written Opinion issued by the International Searching Authority regarding Application No. PCT/US2019/059387, dated May 18, 2020, 6 pages.

(Continued)

*Primary Examiner* — William H Rodriguez
(74) *Attorney, Agent, or Firm* — Avant Law Group, LLC

(57) ABSTRACT

An apparatus and method for reducing the vibrations to a transition duct and improving the assembly and fit-up of a transition duct relative to a combustion system are disclosed. A damping member is provided between the transition duct and its mounting points to the gas turbine engine. The damping member comprises one or more layers of a composite material positioned between layers of sheet metal. An adjustable mounting system is also provided for the transition duct to allow for movement of a transition duct relative to the combustion liner.

20 Claims, 9 Drawing Sheets

(56) References Cited

U.S. PATENT DOCUMENTS

| | | | | |
|---|---|---|---|---|
| 2006/0162314 A1* | 7/2006 | Youngblood | F01D 25/12 | 60/39.37 |
| 2006/0271311 A1* | 11/2006 | Gao | G06Q 10/00 | 702/34 |
| 2006/0288707 A1* | 12/2006 | Weaver | F23R 3/60 | 60/796 |
| 2007/0033941 A1* | 2/2007 | Riggi, Jr. | F01D 9/023 | 60/752 |
| 2007/0240422 A1* | 10/2007 | Jorgensen | F01D 9/023 | 60/752 |
| 2009/0101788 A1* | 4/2009 | Kidder | F23R 3/60 | 248/674 |
| 2009/0115141 A1* | 5/2009 | Simmons | F16J 15/0887 | 277/630 |
| 2009/0145137 A1* | 6/2009 | Rizkalla | F01D 9/023 | 60/796 |
| 2009/0188258 A1* | 7/2009 | Rizkalla | F01D 9/023 | 60/800 |
| 2009/0249791 A1* | 10/2009 | Belsom | F23R 3/60 | 60/755 |
| 2012/0292860 A1* | 11/2012 | Moehrle | F01D 9/023 | 277/640 |
| 2013/0255276 A1* | 10/2013 | Jorgensen | F01D 9/023 | 60/796 |
| 2013/0298369 A1* | 11/2013 | Reyes | F01D 9/023 | 29/407.1 |
| 2014/0260272 A1* | 9/2014 | DiCintio | F01D 9/023 | 60/739 |
| 2014/0260273 A1* | 9/2014 | Melton | F23R 3/002 | 60/739 |
| 2014/0260280 A1* | 9/2014 | Willis | F01D 11/18 | 60/752 |
| 2015/0128609 A1* | 5/2015 | Piersail | F01D 25/04 | 60/796 |
| 2017/0248027 A1* | 8/2017 | Schiavo | F16J 15/0887 | |
| 2017/0268355 A1* | 9/2017 | Kumar | F23R 3/60 | |
| 2018/0266464 A1* | 9/2018 | Klingels | F16B 37/122 | |
| 2018/0355799 A1* | 12/2018 | Terauchi | F02C 7/20 | |
| 2019/0078470 A1* | 3/2019 | Park | F01D 25/28 | |

OTHER PUBLICATIONS

Office Action issued by the United States Patent and Trademark Office regarding U.S. Appl. No. 16/179,378, dated Aug. 13, 2020, 9 pages.

* cited by examiner

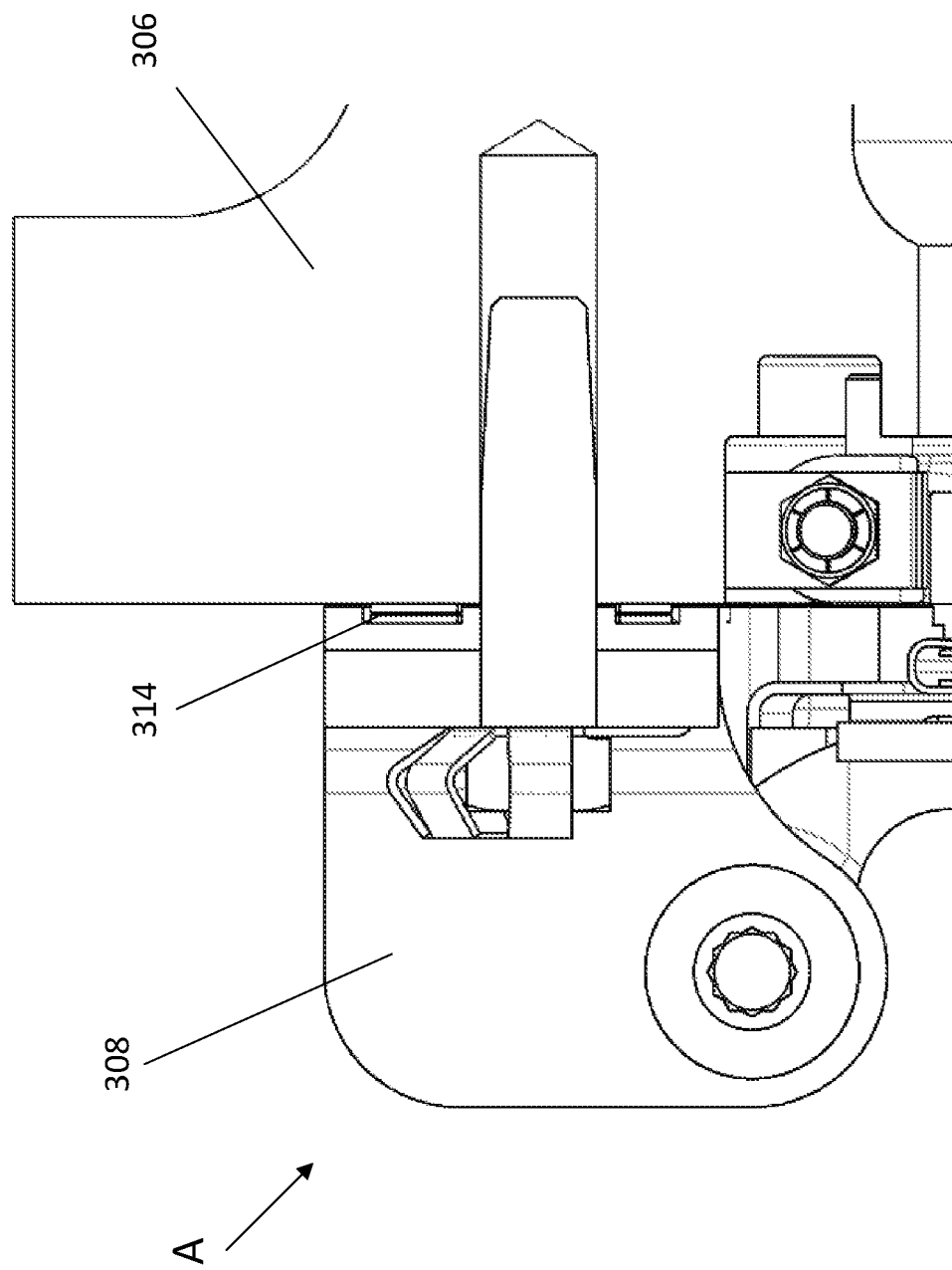

METHOD AND APPARATUS FOR MOUNTING A TRANSITION DUCT IN A GAS TURBINE ENGINE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This present disclosure relates generally to a method and apparatus for mounting a transition duct in a gas turbine engine. More specifically, embodiments of the present disclosure relate to the use of a damping member and adjustable mounting system for use in securing a transition duct within a gas turbine engine.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure are increased as it passes through subsequent stages of the compressor. The compressed air is then directed to one or more combustors where it is mixed with a fuel source to create a combustible mixture. This mixture is ignited in the combustors to create a flow of hot combustion gases. These gases are then directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

Due to the geometry of a gas turbine engine, often times the combustion system is not directly in radial or axial alignment with the compressor or the turbine inlet. For example, where a plurality of can annular combustors are utilized, the individual combustors are typically oriented at an angle relative to the engine centerline. As such, it is necessary to connect the angled combustors to the inlet of the turbine. A transition duct 100 in accordance with the prior art is depicted in FIGS. 1 and 2. The transition duct 100 has a generally circular inlet end 102 which tapers to an arc-shaped frame-like outlet end 104 that is coupled to an inlet of the turbine for directing combustion gases from the combustion system and to the turbine. As a result of the complex and changing shape and function of the transition duct, the transition duct is subject to extreme vibrations, which can cause wear and distress on the transition duct and its adjacent engine components.

Furthermore, due to the complex and changing geometry between a combustion system and a turbine, it is often difficult to properly align a transition duct connecting the combustion system to the turbine. Traditional transition ducts utilize a fixed mounting system 106 and do not compensate for misalignment between a combustion system and the turbine.

BRIEF SUMMARY OF THE DISCLOSURE

The present disclosure relates to a method and apparatus for reducing vibrations between a gas turbine transition duct and adjacent components in the gas turbine engine. Furthermore, a system and method is provided for adjusting a mounting system for a transition duct.

In an embodiment of the present disclosure, a system for reducing vibrations between a combustion system and a gas turbine engine is disclosed. The system comprises a transition duct connecting the combustion system to an inlet of a turbine through a first mounting mechanism and a second mounting mechanism and multiple damping members. The damping member is positioned between the first mounting mechanism and the gas turbine engine and between the second mounting mechanism and the gas turbine engine. The damping member comprises one or more layers of a composite material positioned between layers of sheet metal. The damping member absorbs at least some of the vibrations between the transition duct and adjacent components of the gas turbine engine.

In an alternate embodiment of the present disclosure, an adjustable mounting system for a transition duct is provided. The mounting system comprises a support plate secured to an inlet ring of a transition duct. The support plate comprises a slot and a plurality of clearance holes and an H-block plate positioned adjacent a forward face of the support plate and having a plurality of first holes and a leg portion extending through the slot in the support plate. One or more backing plates are positioned adjacent an aft face of the support plate, where the one or more backing plates each having a second hole. A plurality of fasteners couple the H-block plate, support plate, and backing plate together such that the support plate and transition duct inlet can be adjusted.

In yet another embodiment of the present disclosure, a method of adjusting a location of an inlet to a transition duct in a gas turbine engine is disclosed. A transition duct is provided for coupling a combustion system to a turbine inlet, where the transition duct has a support plate secured to an inlet ring of a transition duct. The support plate comprises a slot and a plurality of clearance holes, an H-block plate having a leg portion and a plurality of first holes, and one or more backing plates each having a second hole. An outlet end of the transition duct is positioned relative to an inlet of the turbine and an inlet ring of the transition duct is positioned relative to a second mounting mechanism. The H-block plate slides through the support plate and one or more backing plates are placed against the support plate. The transition duct and support plate are adjusted such that the transition duct is properly aligned at an inlet end relative to a known combustion system position. A fastener is then placed through a first hole, a clearance hole, and a second hole such that the H-block plate and the one or more backing plates contact the support plate and are secured together holding the transition duct inlet end in a desired position.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein:

FIG. 6 is a partial cross section of the gas turbine engine depicted in FIG. 3.

DETAILED DESCRIPTION OF THE DISCLOSURE

Figure 1:
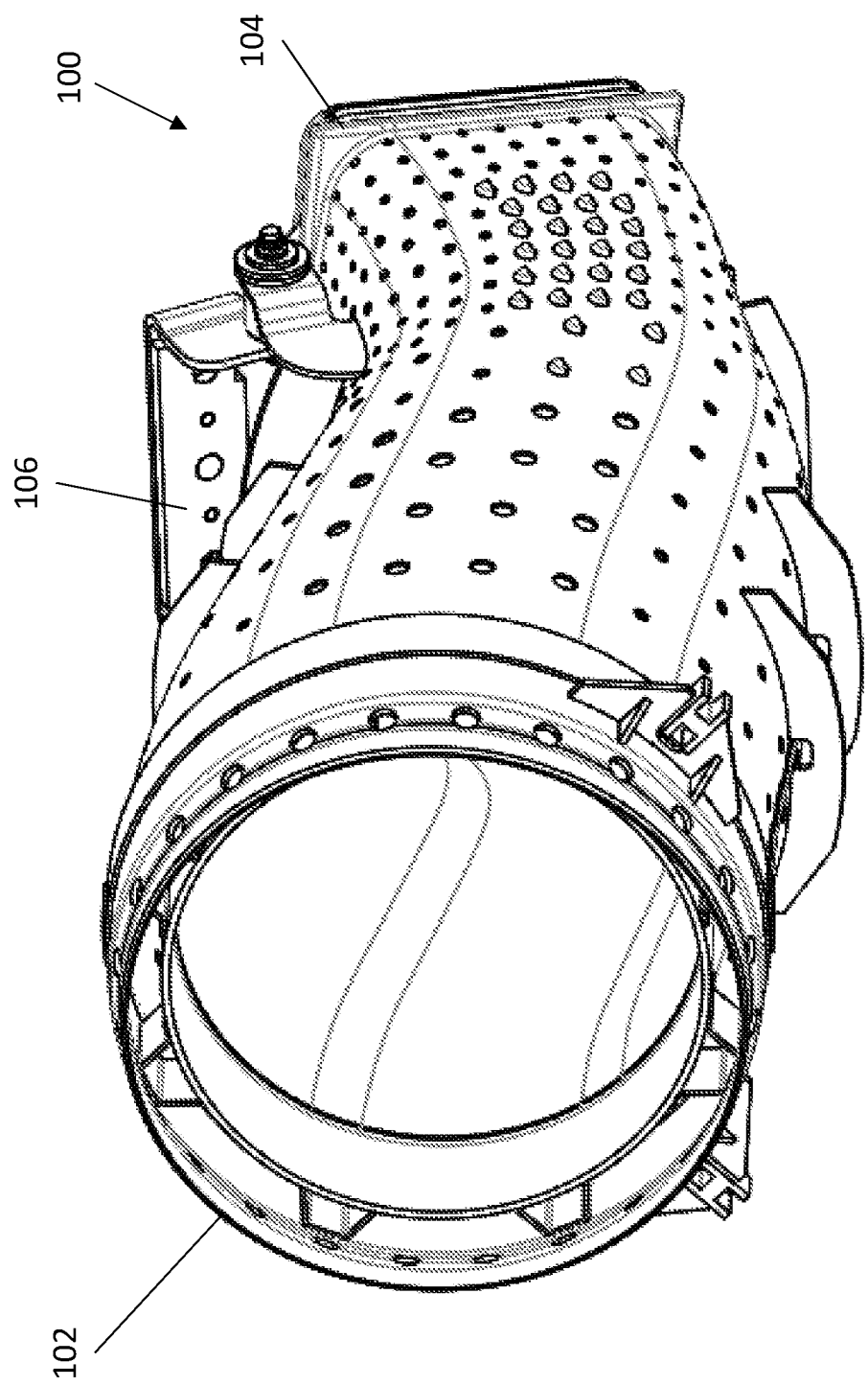
FIG. 1 is a perspective view of a transition duct in accordance with the prior art.
Figure 2:
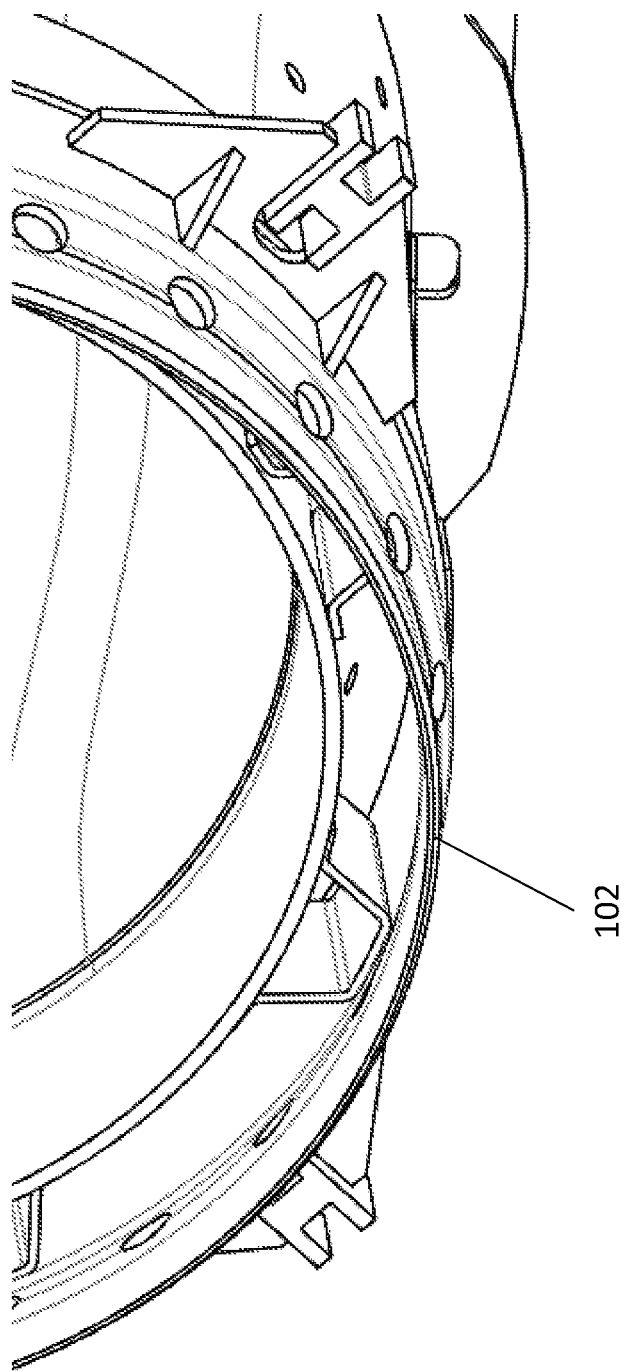
FIG. 2 is an alternate perspective view of a portion of the transition duct on FIG. 1 in accordance with the prior art.
Figure 3:
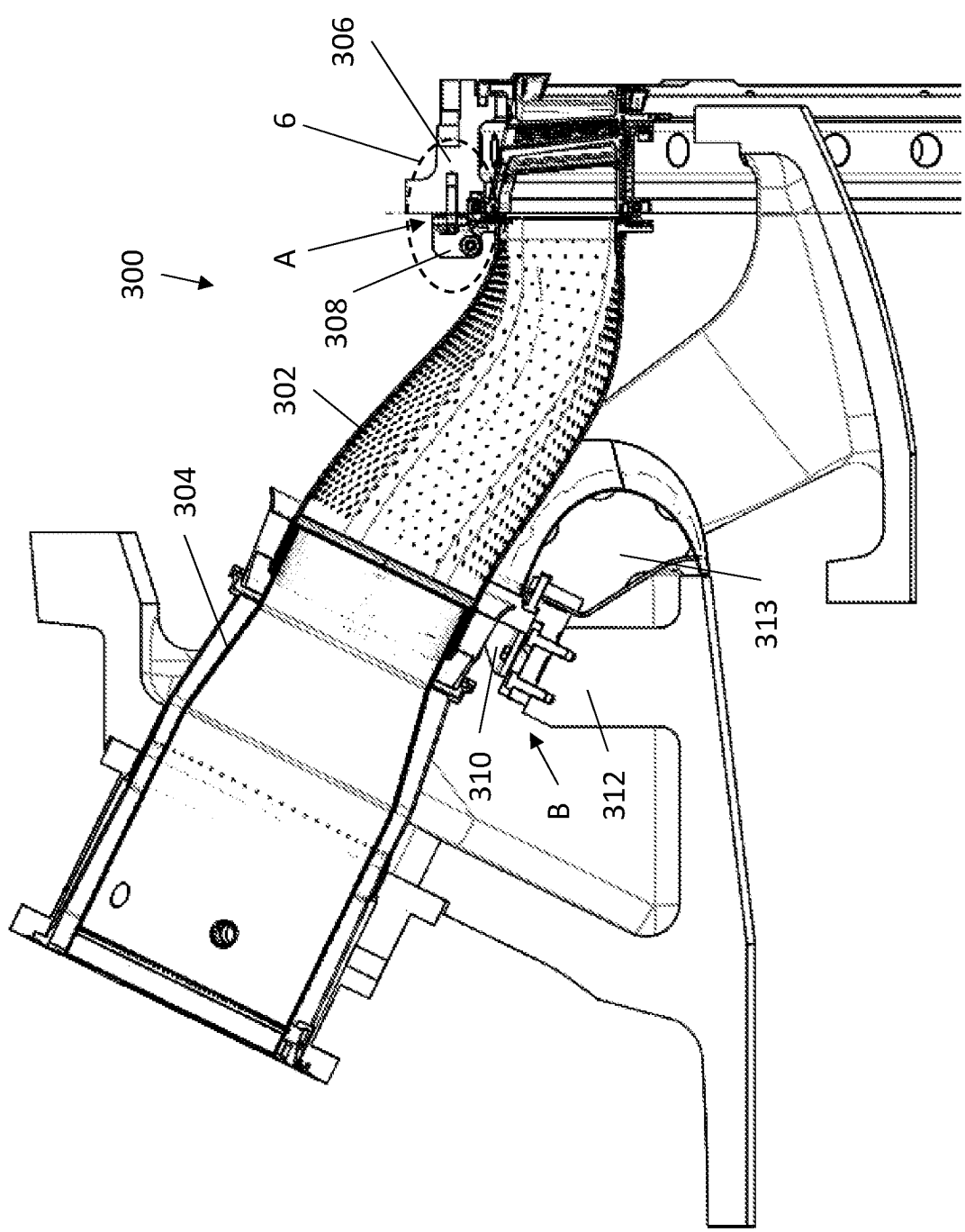
FIG. 3 is a cross section view of a portion of a gas turbine engine in accordance with an embodiment of the present disclosure.

The present disclosure is intended for use in a gas turbine engine, such as a gas turbine used for aircraft engines and/or power generation. As such, the present disclosure is capable of being used in a variety of turbine operating environments, regardless of the manufacturer.

As those skilled in the art will readily appreciate, a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor is mixed with fuel which is burned in the combustion section and expanded in the turbine. The combustion system is connected to the turbine by a transition duct, where the transition duct changes in radial and circumferential profile along its axial length in order to transition from a combustion system to a turbine inlet.

The present disclosure is depicted in FIGS. 3-10. Referring initially to FIGS. 3-6, a system 300 for reducing vibrations between a combustion system and a gas turbine engine is provided. The system 300 comprises a transition duct 302 connecting a combustion system 304 to an inlet 306 of a turbine. A first mounting mechanism 308 connects the transition duct 302 to the turbine inlet 306 while a second mounting system 310 couples a forward portion of the transition duct 302 to an aft end of the combustion system 304. The first mounting mechanism 308 can be a hinge bracket or other mechanism attached to the turbine inlet 306, while the second mounting mechanism 310 is preferably a fixed bracket secured to a frame in the compressor discharge case 312.

Figures 4, 5:
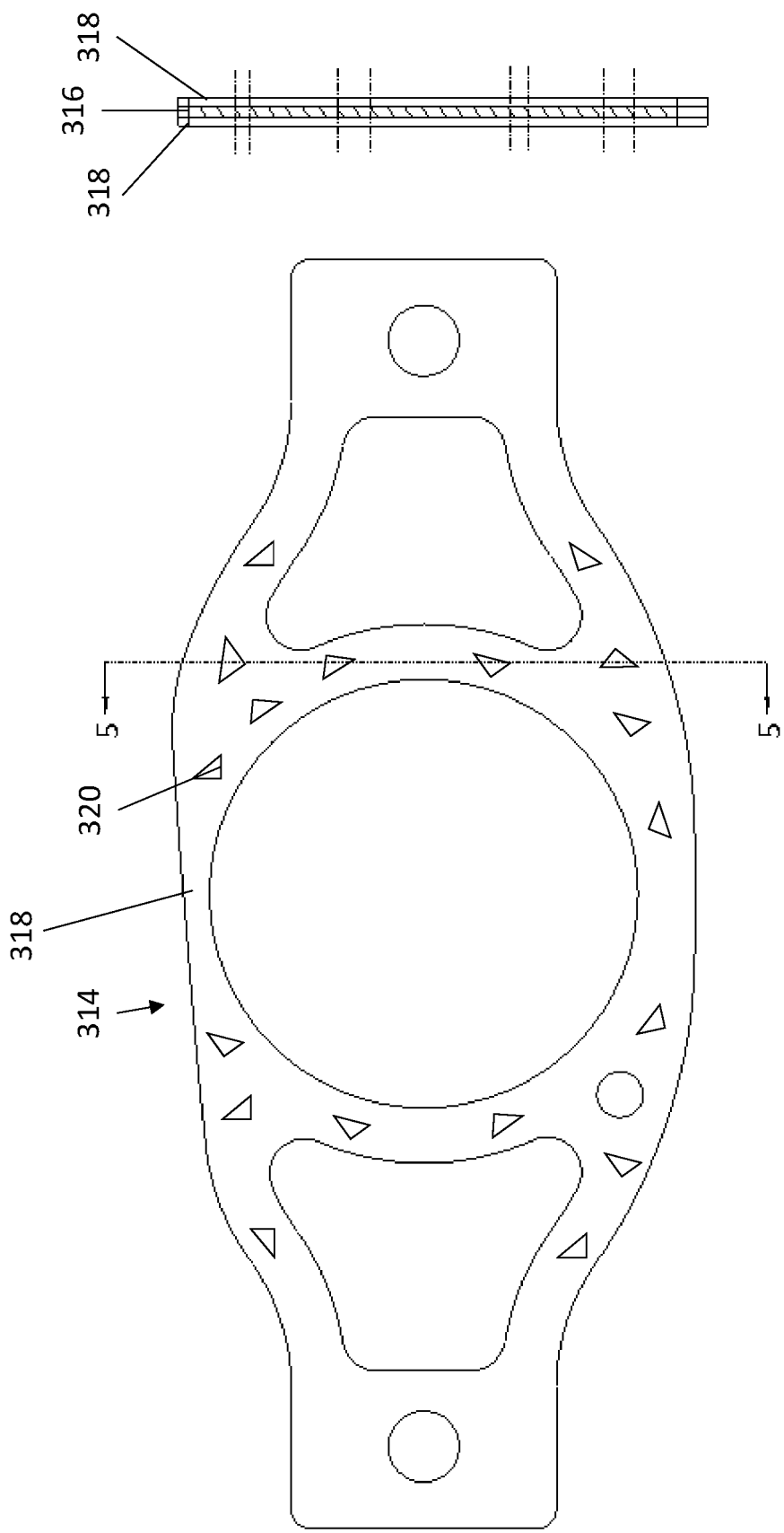
FIG. 4 is an elevation view of a damping member in accordance with an embodiment of the present disclosure.
FIG. 5 is a cross section view taken through the damping member of FIG. 4 in accordance with an embodiment of the present disclosure.

Referring to FIGS. 4-6, the system 300 also comprises a damping member 314 positioned between the first mounting mechanism 308 and the turbine inlet of the gas turbine engine 300. This is shown as region A in FIG. 3 and also in FIG. 6. The same damping member can be utilized in other mounting regions, such as region B, which is between the second mounting mechanism 310 and the gas turbine engine 300. More specifically, the damping member 314 can be mounted between the bracket of the second mounting mechanism 310 and the compressor discharge case 312. A similar damping member can be placed in other component interfaces, such as between a diffuser guide vane 313 and its mounting structure in the compressor discharge case of the gas turbine engine.

Referring now to FIGS. 4 and 5, the damping member 314 comprises a flat plate-like configuration comprising one or more layers of composite material 316 positioned between multiple layers of sheet metal 318. This multi-layer arrangement is shown in cross section in FIG. 5. The damping member 314 also comprises a plurality of openings 320, where the openings 320 are in the layers of sheet metal 318 and are similar to punches in the sheet metal 318. Edges of raw sheet metal from the openings 320 engage the one or more layers of composite material 316 when the layers are sandwiched together. The one or more layers of composite material 316 can be a variety of materials. One such acceptable material is vermiculite due to its high temperature capability. When coupled with thin sheets of metal, this material works to absorb vibrations between adjacent combustor components.

Referring now to FIGS. 7-10, an alternate embodiment of the present disclosure is shown in which a transition duct includes an adjustable mounting system 700. Details of the adjustable mounting system are more clearly defined in FIGS. 9 and 10. The adjustable mounting system 700 comprises a support plate 702 secured to an inlet ring 704 of a transition duct. The support plate 702 can be secured to the inlet ring 704 by a variety of means such as welding or brazing. Alternatively, the support plate 702 can be integrally formed with the inlet ring 704, such as in a casting.

Figure 10:
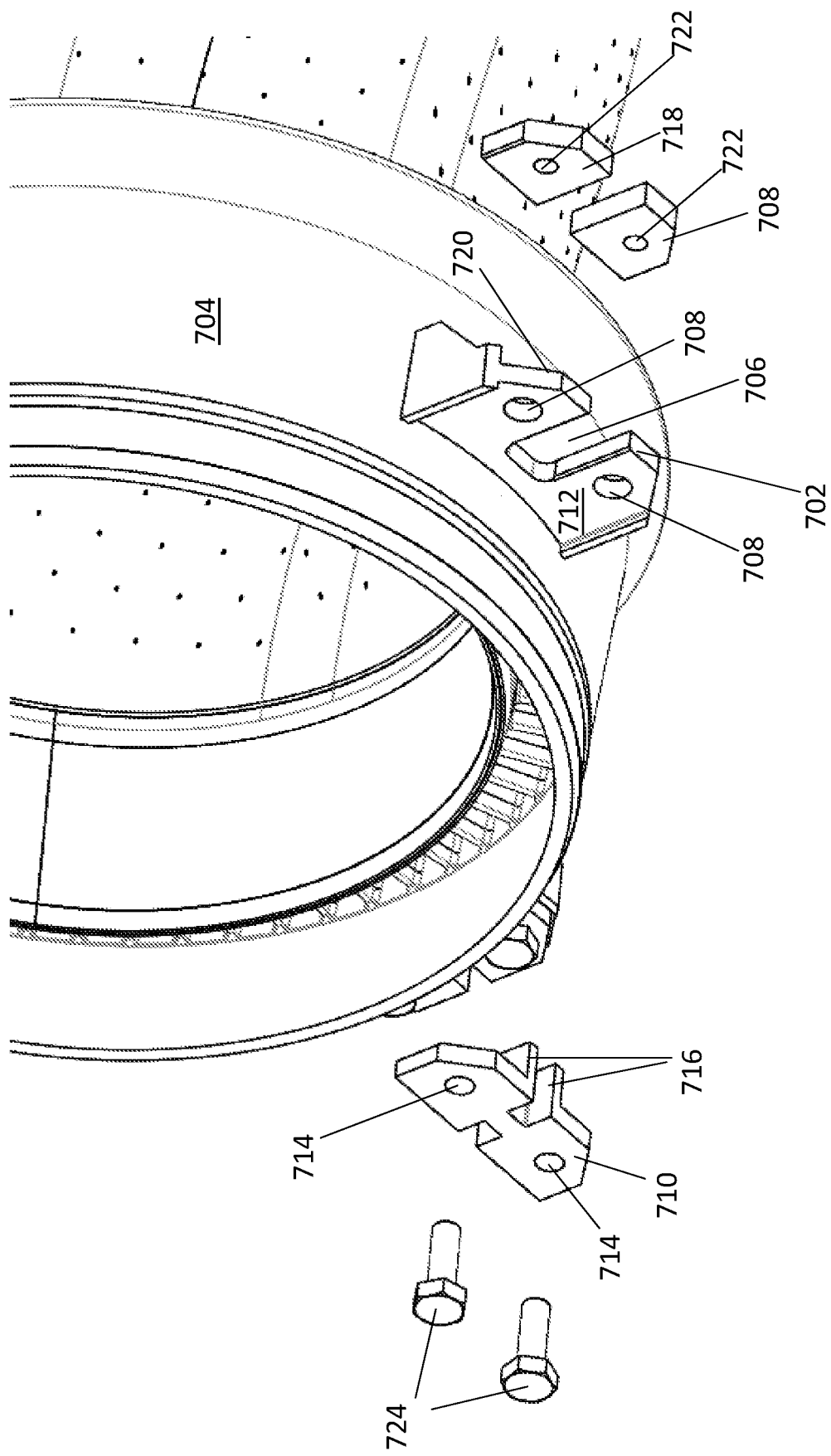
FIG. 10 is an exploded perspective view of a portion of a transition duct in accordance with an alternate embodiment of the present disclosure.

Referring now to FIG. 10, the support plate 702 further comprises a slot 706 and a plurality of clearance holes 708. In an embodiment of the present disclosure, the slot 706 is U-shaped, but the exact configuration and shape of the slot 706 can vary depending on preferred manufacturing techniques and other components of the adjustable mounting system 700. As shown in FIG. 10, the clearance holes 708 are circular. However, in an alternate embodiment of the present disclosure, the clearance holes 708 can be non-circular.

An H-block plate 710 is positioned adjacent a forward face 712 of the support plate 702. The H-block plate 710 also has a plurality of first holes 714 and a leg portion 716 extending through the slot 706 in the support plate 702. One or more backing plates 718 are positioned adjacent an aft face 720 of the support plate 702. The one or more backing plates 718 each have a second hole 722 located therein. For the embodiment of the present disclosure shown in FIGS. 7-10, two backing plates are utilized, each with a second hole 722, and each positioned on opposite sides of the leg portion 716 of the H-block plate 710. The exact configuration of the backing plates 718 can vary depending on the configuration of the support plate 702.

A plurality of fasteners 724 are utilized to couple the H-block plate 710, the support plate 702, and the one or more backing plates 718 together. In one embodiment of the present disclosure, the second holes 722 in the backing plates 718 are threaded such that the fasteners 724 engage the threads of the second holes 722, thus drawing the H-block 710 and backing plates 718 into contact with the support plate 702. In addition to the second holes 722 being threaded, alternate means by which the fasteners 724 can be secured in place include placing a nut or other retaining device on the threaded portion of the fastener 724 adjacent the one or more backing plates 718. Alternatively, the fasteners 724 can be tack welded to the H-block plate 710, or anti-rotation tabs (not shown) can be used to prevent the fasteners 724 from coming loose and backing out of the threaded second holes 722. Other similar retention methods can be used.

Figure 7:
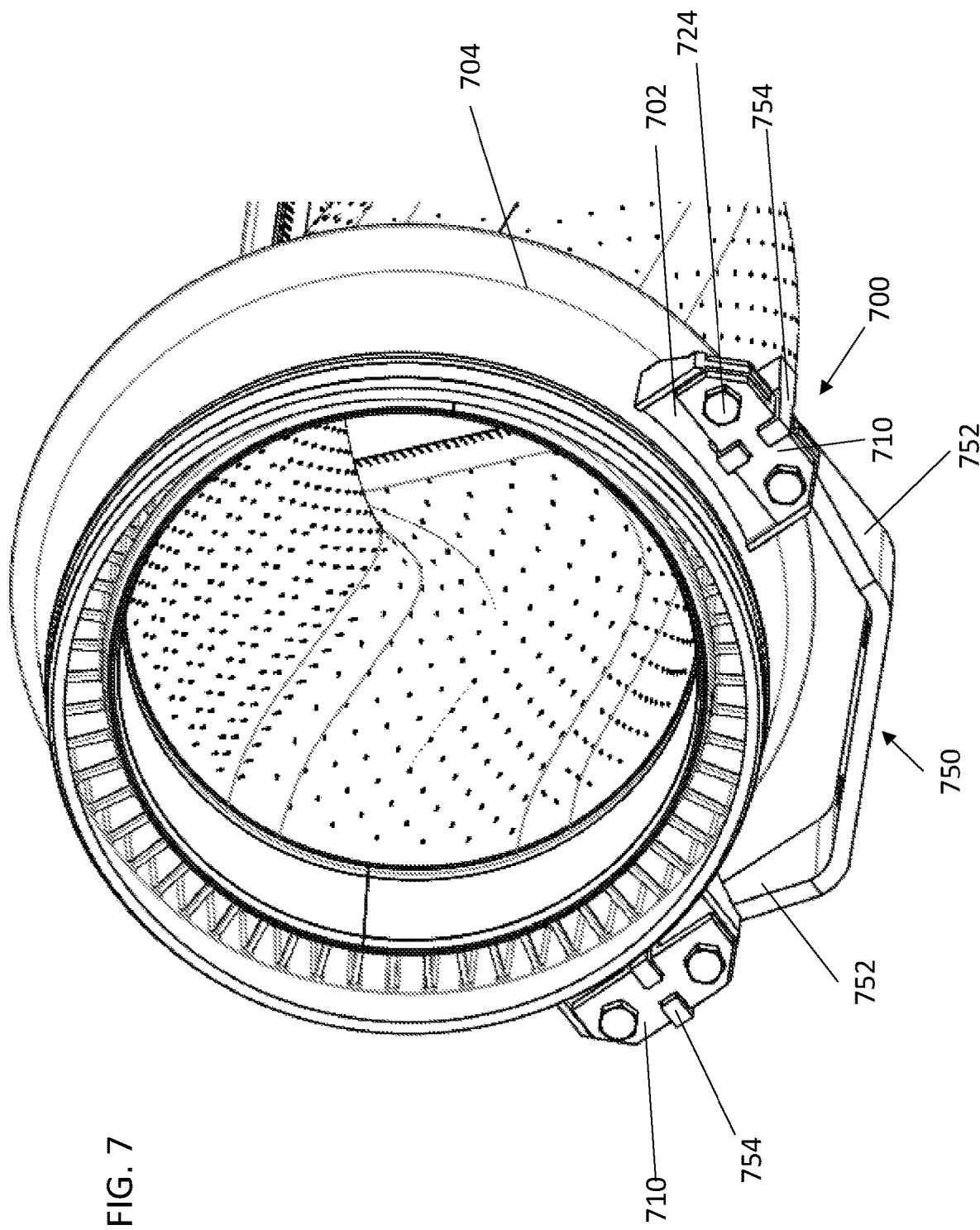
FIG. 7 is a perspective view of a portion of a transition duct in accordance with an embodiment of the present disclosure.
Figure 9:
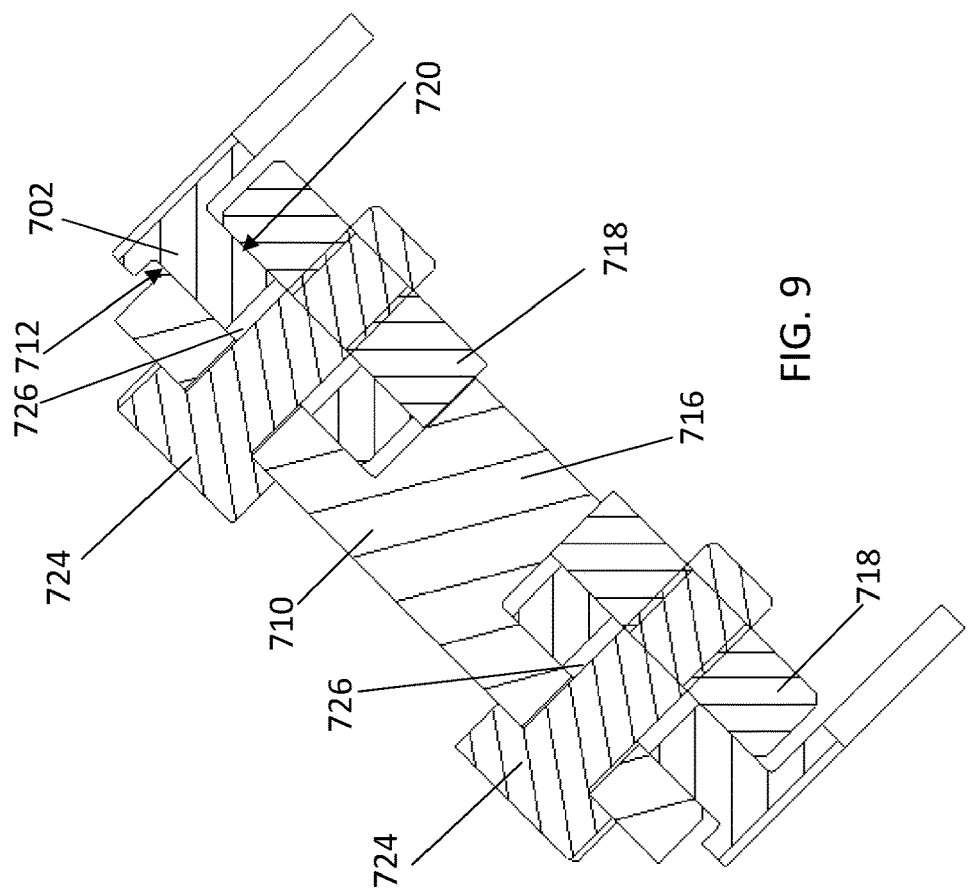
FIG. 9 is a cross section view taken through a portion of the transition duct of FIG. 8.
Figure 8:
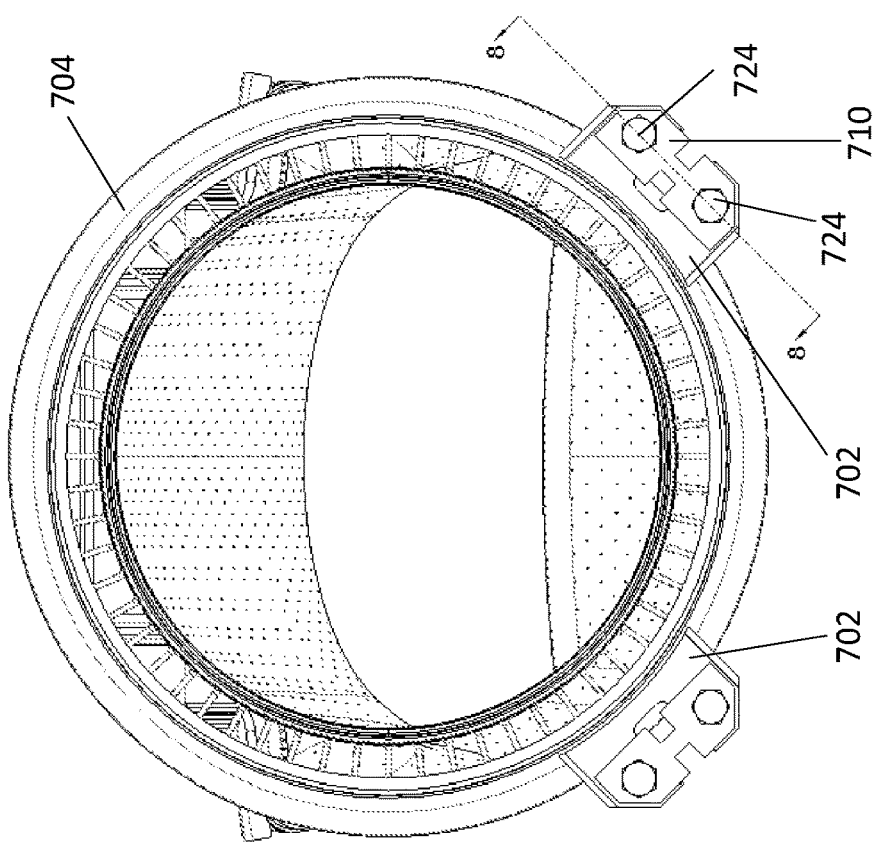
FIG. 8 is an elevation view of the transition duct in accordance with an embodiment of the present disclosure.

One of the advantages of the present disclosure, which is shown in more detail in FIGS. 7-9, is the ability to adjust the location of the inlet to a transition duct, or inlet ring 704, generally in a plane parallel to that of the support plate 702. As one skilled in the art will understand, the transition duct in which the adjustable mounting system 700 operates, is supported in place by a bracket 750. The bracket 750, commonly referred to as a bullhorn bracket, includes arms 752 and fingers 754 which engage openings created by the H-block plate 710 and the support plate 702 and support the weight of the transition duct, as shown in FIG. 7. This ability to adjust the location of the transition duct inlet is provided as a result of the plurality of clearance holes 708 compared to that of the plurality of first holes 714 and second holes 722. That is, the plurality of clearance holes 708 are larger in diameter than the plurality of first holes 714 and second holes 722, resulting in a gap 726. Due to the gap 726 between the fasteners 724 and the support plate 702, the inlet ring 704, and thus the transition duct, is capable of small planar adjustments until the fasteners 724 are locked down and the H-block plate 710 and the one or more backing plates 718 are pulled together and lock the support plate 702 in place. The embodiment depicted in FIGS. 7-10 include circular clearance holes 708. However, non-circular holes, such as racetrack shaped holes can also be utilized, thus creating even further adjustment capability.

Figure 11:
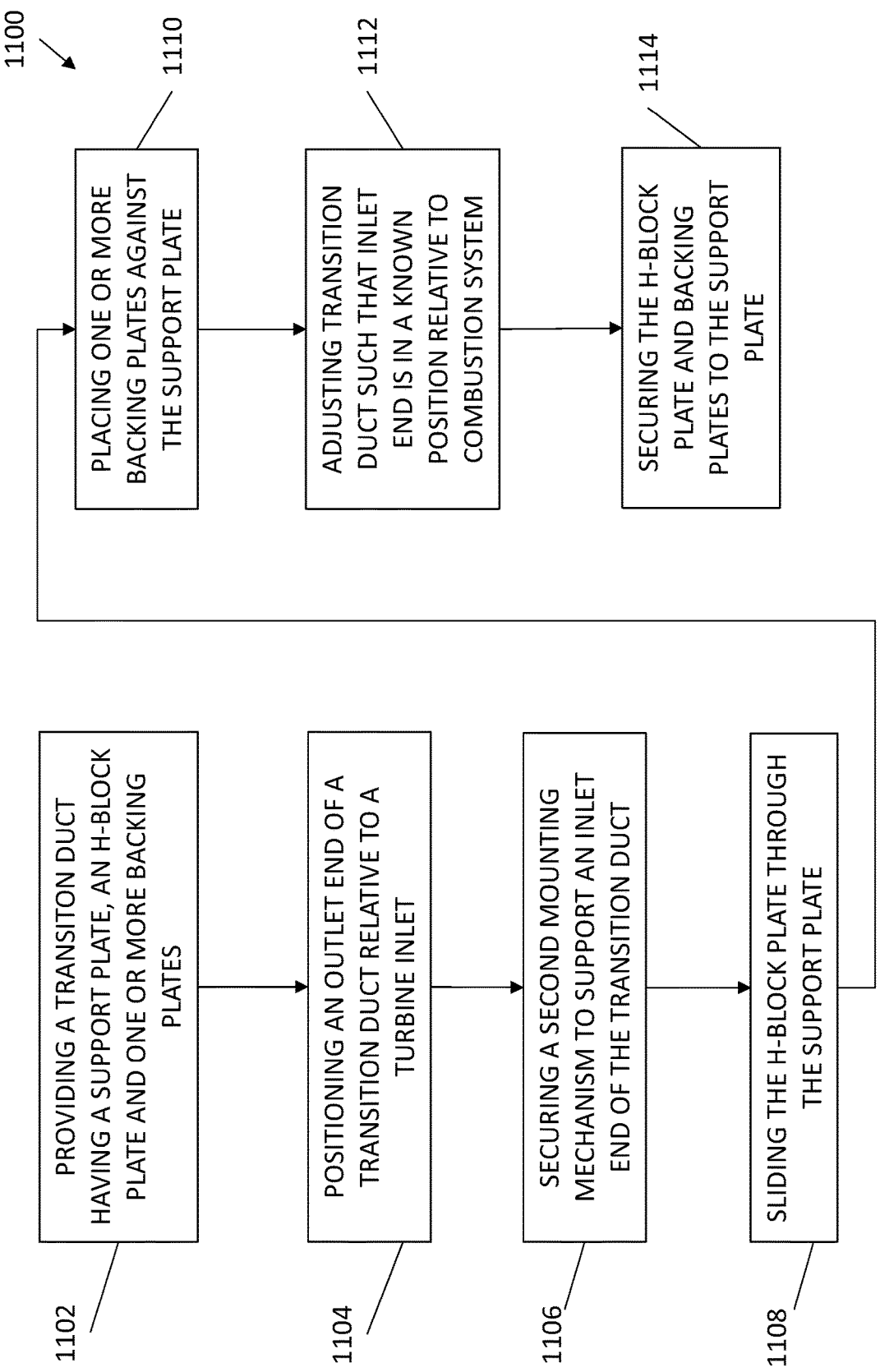
FIG. 11 is a flowchart illustrating a method of adjusting a location of an inlet to a transition duct in a gas turbine engine.

In another embodiment of the present disclosure, a method of adjusting a location of an inlet to a transition duct in a gas turbine engine is provided in FIG. 11. This method 1100, may be performed utilizing a fixture simulating known positions of the turbine inlet and a combustor, such that the transition ducts are properly configured prior to being installed in a gas turbine engine. In a step 1102, a transition duct is provided for coupling a combustion system to an inlet of a turbine. The transition duct has a support plate secured to an inlet ring of a transition duct, where the support plate comprises a slot and a plurality of clearance holes, an H-block plate having a leg portion and a plurality of first holes, and one or more backing plates each having a second hole.

In a step 1104, an outlet end of the transition duct is positioned relative to a turbine inlet. Then, in a step 1106, a second mounting mechanism is secured to support the inlet end or inlet ring of the transition duct. This second mounting mechanism can be a bullhorn bracket, as discussed above. In a step 1108 the H-block plate is slid through the slot in the support plate. One or more backing plates are placed against the support plate in a step 1110 and in a step 1112 the transition duct and support plate are adjusted in position relative to the H-block plate and one or more backing plates such that the transition duct is properly aligned at its inlet end relative to a known position for the combustion system. In a step 1114, a fastener is placed through a first hole, a clearance hole, and a second hole such that the H-block plate and the one or more backing plates contact the support plate and are secured together.

Although a preferred embodiment of this disclosure has been disclosed, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious, and which are inherent to the structure.

It will be understood that certain features and subcombinations are of utility and may be employed without reference to other features and subcombinations. This is contemplated by and is within the scope of the claims.

Having thus described the disclosure, what is claimed is:

1. An adjustable mounting system for a transition duct comprising:
   a support plate secured to an inlet ring of a transition duct, the support plate comprising a slot and a plurality of clearance holes;
   an H-block plate positioned adjacent a forward face of the support plate and having a plurality of first holes and a leg portion extending through the slot in the support plate;
   one or more backing plates positioned adjacent an aft face of the support plate, the one or more backing plates each having a second hole; and,
   a plurality of fasteners coupling the H-block plate, support plate, and backing plate together, wherein each of the plurality of fasteners couples the H-block, support plate, and backing plate together by passing through each of one of the plurality of clearance holes, one of the plurality of first holes, and the second hole of one of the one or more of the backing plates.

2. The mounting system of claim 1, wherein the slot of the support plate is U-shaped.

3. The mounting system of claim 1, wherein the clearance holes of the support plate are non-circular.

4. The mounting system of claim 1, wherein the plurality of clearance holes in the support plate have a diameter greater than a diameter of the plurality of first holes or the second holes.

5. The mounting system of claim 1, wherein a position of the transition duct is adjustable in a plane parallel to the support plate.

6. The mounting system of claim 1, wherein the support plate is welded to the inlet ring of the transition duct.

7. The mounting system of claim 1, wherein each of the second holes is threaded for coupling to the plurality of fasteners.

8. The mounting system of claim 1, wherein the one or more backing plates are positioned on opposing sides of the leg portion of the H-block plate.

9. The mounting system of claim 1 further comprising a means for retaining the plurality of fasteners in the adjustable mounting system.

10. An adjustable mounting system for a transition duct comprising:
    a support plate having a slot, the support plate secured to an inlet ring of a transition duct;
    an H-block plate positioned adjacent a forward face of the support plate and having a plurality of first holes and a leg portion extending through the slot in the support plate;
    one or more backing plates positioned adjacent an aft face of the support plate, the one or more backing plates each having a second hole; and
    a plurality of fasteners, each of the plurality of fasteners coupling each of the H-block plate, support plate, and one of the one or more backing plates together.

11. The adjustable mounting system of claim 10, wherein the slot of the support plate is U-shaped.

12. The adjustable mounting system of claim 10, further comprising a plurality of clearance holes in the support plate.

13. The adjustable mounting system of claim 12, wherein the plurality of clearance holes of the support plate is non-circular.

14. The adjustable mounting system of claim 13, wherein the plurality of clearance holes in the support plate have a diameter greater than a diameter of the plurality of first holes or the second holes.

15. The adjustable mounting system of claim 14, wherein a position of the transition duct is adjustable in a plane parallel to the support plate.

16. The adjustable mounting system of claim 10, wherein a position of the transition duct is adjustable in a plane parallel to the support plate.

17. The adjustable mounting system of claim 10, wherein the support plate is welded to the inlet ring of the transition duct.

18. The adjustable mounting system of claim 10, wherein each of the second holes is threaded for coupling to the plurality of fasteners.

19. The adjustable mounting system of claim 10, wherein one or more backing plates are positioned on opposing side of the leg portion of the H-block plate.

20. The adjustable mounting system of claim 19, further comprising a means for retaining the plurality of fasteners in the adjustable mounting system.

\* \* \* \* \*